(12) United States Patent
Sivalingam et al.

(10) Patent No.: US 11,807,381 B2
(45) Date of Patent: Nov. 7, 2023

(54) AIRCRAFT HYBRID PROPULSION SYSTEM INCLUDING COLD PLATE FOR A HIGH DENSITY POWER CONVERTER

(71) Applicants: Krishnamoorthi Sivalingam, Seletar (SG); Chandana J. Gajanayake, Seletar (SG); Jeyaraman Kumaravel, Jurong (SG); Palanisamy Mohan Kumar, Jurong (SG); Govind Pandey, Jurong (SG); Yunzhe Zhai, Jurong (SG); Divya Bharathi Perumal, Jurong (SG)

(72) Inventors: Krishnamoorthi Sivalingam, Seletar (SG); Chandana J. Gajanayake, Seletar (SG); Jeyaraman Kumaravel, Jurong (SG); Palanisamy Mohan Kumar, Jurong (SG); Govind Pandey, Jurong (SG); Yunzhe Zhai, Jurong (SG); Divya Bharathi Perumal, Jurong (SG)

(73) Assignee: Rolls-Royce Corporation, Indianapolis, IN (US)

( * ) Notice: Subject to any disclaimer, the term of this patent is extended or adjusted under 35 U.S.C. 154(b) by 310 days.

(21) Appl. No.: 17/203,324

(22) Filed: Mar. 16, 2021

(65) Prior Publication Data
US 2022/0297848 A1    Sep. 22, 2022

(51) Int. Cl.
*B64D 33/08*    (2006.01)
*B64D 27/02*    (2006.01)
*B64D 27/24*    (2006.01)
*B64D 27/10*    (2006.01)

(52) U.S. Cl.
CPC ............. *B64D 33/08* (2013.01); *B64D 27/02* (2013.01); *B64D 27/10* (2013.01); *B64D 27/24* (2013.01); *B64D 2027/026* (2013.01)

(58) Field of Classification Search
CPC .. B64D 27/02; B64D 2027/026; B64D 27/10; B64D 27/24; B64D 33/08
USPC ...................................................... 244/53 R
See application file for complete search history.

(56) References Cited

U.S. PATENT DOCUMENTS

| 2,640,329 | A |   | 6/1953 | Ingvardsen |
|---|---|---|---|---|
| 4,887,147 | A | * | 12/1989 | Friedman ................ H01L 23/40 |
|   |   |   |   | 257/713 |
| 5,983,997 | A |   | 11/1999 | Hou |
| 7,298,618 | B2 |   | 11/2007 | Campbell et al. |
| 8,427,832 | B2 |   | 4/2013 | Dede et al. |
| 8,482,919 | B2 |   | 7/2013 | Dede |

(Continued)

FOREIGN PATENT DOCUMENTS

CN          212629071 U     2/2021

OTHER PUBLICATIONS

Preliminary Search Report completed Feb. 21, 2023 and issued in connection with FR 2202239, 9 pages.

*Primary Examiner* — Brady W Frazier
(74) *Attorney, Agent, or Firm* — Barnes & Thornburg LLP

(57) ABSTRACT

A hybrid propulsion system for use with an aircraft includes a gas turbine engine, at least one propulsor, and an electric power system. The electric power system is coupled to the gas turbine engine to generate electrical energy and the propulsor to provide electrical energy to drive the propulsor. The electric power system includes a thermal management system configured to cool a heat load generated by the electric power system.

19 Claims, 8 Drawing Sheets

(56) References Cited

U.S. PATENT DOCUMENTS

| | | | |
|---|---|---|---|
| 8,659,896 B2 | 2/2014 | Dede et al. | |
| 9,230,726 B1 | 1/2016 | Parker et al. | |
| 9,252,069 B2 | 2/2016 | Bhunia et al. | |
| 10,665,530 B2 | 5/2020 | Chen et al. | |
| 11,273,925 B1* | 3/2022 | O'Meallie | B64D 27/24 |
| 2008/0266799 A1* | 10/2008 | Campbell | G06F 1/20 |
| | | | 361/699 |
| 2009/0056916 A1* | 3/2009 | Yesin | F28F 1/126 |
| | | | 29/890.038 |
| 2016/0237900 A1 | 8/2016 | Thiriet et al. | |
| 2017/0328280 A1 | 11/2017 | Hussain et al. | |
| 2019/0360759 A1 | 11/2019 | Collins et al. | |
| 2020/0131995 A1 | 4/2020 | Trawick | |
| 2020/0161721 A1 | 5/2020 | Wang | |
| 2021/0237893 A1* | 8/2021 | Bruce | B64D 31/00 |
| 2021/0320554 A1* | 10/2021 | Wu | H02K 5/225 |

* cited by examiner

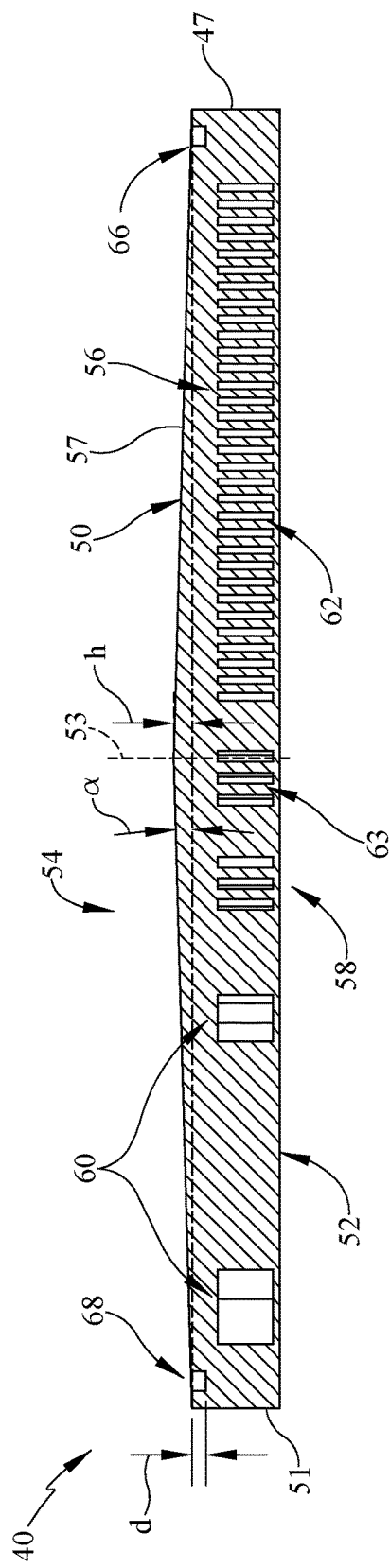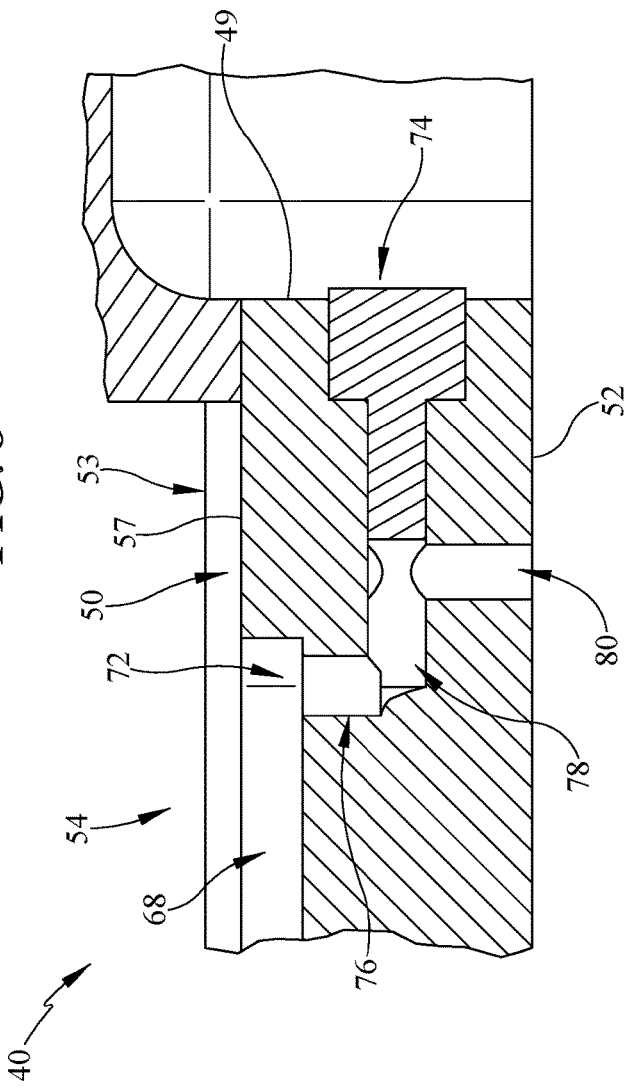

AIRCRAFT HYBRID PROPULSION SYSTEM INCLUDING COLD PLATE FOR A HIGH DENSITY POWER CONVERTER

FIELD OF THE DISCLOSURE

The present disclosure relates generally to hybrid electric propulsion systems and more specifically to hybrid electric propulsion systems with high power density converters.

BACKGROUND

Gas turbine engines are used to power aircraft, watercraft, power generators, etc. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Hybrid turbo electric propulsion systems may be used to power aircraft. In hybrid turbo electric aero-propulsion systems, an electric motor may be used in combination with a turbine engine to provide motive power to one or more propulsors, such as a fan or a propeller. Hybrid electric propulsion systems may rely on rectifiers or converters for converting alternating current (AC) from a generator into direct current (DC) which is then passed through high voltage cabling before being converted back into AC for use in a motor. Managing the temperature of the electrical components may be challenging in such applications.

SUMMARY

The present disclosure may comprise one or more of the following features and combinations thereof.

A hybrid propulsion system for use with an aircraft may include a gas turbine engine, an electric power system, at least one propulsor, and a thermal management system. The gas turbine engine may include a compressor, a combustor, and a turbine. The electric power system may be coupled to the gas turbine engine to generate electrical energy. The propulsor may be configured to use energy received from the electric power system to generate thrust for propelling the aircraft. The thermal management system may be configured to cool a heat load produced by a converter of the electric power system.

In some embodiments, the electric power system may include a generator, the converter, and an electric motor. The generator may be coupled to the gas turbine engine to generate electrical energy. The converter may be connected to the generator to receive the electrical energy from the generator. The electric motor may be configured to produce rotational energy in response to receiving electric energy from the converter.

In some embodiments, the thermal management system may include a cold plate and a pump. The cold plate may be in thermal communication with the converter. The pump may be configured to move a flow of cooling fluid through the cold plate to transfer heat from the converter to the cooling fluid.

In some embodiments, the cold plate may include an inlet, an outlet adjacent to the inlet, and a cooling passageway. The inlet may be configured to receive the flow of cooling fluid from the pump. The outlet may be configured to discharge the flow of cooling fluid. The cooling passageway may extend between and interconnect the inlet and the outlet.

In some embodiments, the cooling passageway may be shaped to define at least one array of parallel flow channels. The array of parallel flow channels may be configured to provide the thermal heat transfer from the converter to the cooling fluid while managing a pressure drop across the cooling passageway.

In the illustrative embodiment, each flow channel of the array of flow channels may have a width. The width may be about 2.5 millimeters.

In some embodiments, each flow channel of the array of flow channels may have a cross-section that is non-linear. In some embodiments, the array of flow channels may be defined by a plurality of rows of fins that extend into the cooling passageway.

In some embodiments, the flow of cooling fluid may have a flow rate of about 10 liters per minute. The cold plate may have a thermal resistance between about 0.00186 degrees Celsius per watt and about 0.00196 degrees Celsius per watt for the flow rate. In some embodiments, the pressure drop across the cooling passageway may be between about 28.4 millibar and about 211 millibar for an inlet temperature range of about 60 degrees Celsius to about negative 40 degrees Celsius.

In some embodiments, the cooling passageway may include a first section, a second section, and a third section. The first section may be in fluid communication with the inlet to receive the flow of cooling fluid. The second section may be in fluid communication with the first section and the outlet to discharge the flow of cooling fluid. The third section may be in fluid communication with the first section, the second section, and the outlet to discharge the flow of cooling fluid. In some embodiments, the first, second, and third sections may each extend between opposite side surfaces and are parallel to each other.

In some embodiments, the first section may include a first array of parallel flow channels and the second section may include a second array of parallel flow channels. The third section may include a ladder type configuration of flow channels.

In some embodiments, the first section of the cooling passageway may have flow distributors. The flow distributors may be located at the inlet of the first array of flow channels. The flow distributors may be configured to diffuse the flow of cooling fluid as the cooling fluid enters from the inlet across the first array of flow channels so as to provide a uniform flow across the first array of flow channels.

In some embodiments, the cold plate further includes a first side, a second side, and a drain system. The first side may be configured to mount the components of the converter. The second side may be spaced apart from the mounting surface to define a thickness of the cold plate. The drain system may be configured to remove condensation formed on the first side of the cold plate so that the condensation does not contact the components of the converter.

In some embodiments, the first side may include a mounting surface and a non-mounting surface. The mounting surface may be engaged with the components of the converter. The non-mounting surface may be sloped at an angle from a center of the cold plate to opposite sides of the cold plate toward the drain system.

In some embodiments, the drain system may include at least two side channels and a plurality of drain holes. The side channels may extend into the non-mounting surface on opposite sides of the cold plate. The plurality of drain holes in each of the at least two side channels may extend through the cold plate.

According to another aspect of the present disclosure, a hybrid propulsion system for use with an aircraft may include a gas turbine engine, at least one propulsor, an electric power system, and a thermal management system. The at least one propulsor may be configured to generate thrust for propelling the aircraft. The electric power system may be coupled to the gas turbine engine to generate electrical energy. The electric power system may be coupled to the at least one propulsor to provide the electrical energy to drive the at least one propulsor. The thermal management system may be configured to cool a heat load produced by the electric power system.

In some embodiments, the system may include a cold plate and a pump. The cold plate may be in thermal communication with a portion of the electric power system. The pump may be configured to move a flow of cooling fluid through the cold plate to transfer heat from the portion of the electric power system to the cooling fluid.

In some embodiments, the cold plate may include an inlet, an outlet adjacent to the inlet, and a cooling passageway. The inlet may be configured to receive the flow of cooling fluid from the pump. The outlet may be configured to discharge the flow of cooling fluid. The cooling passageway may extend between and interconnect the inlet and the outlet.

In some embodiments, the cooling passageway may be shaped to define an array of flow channels. The array of flow channels may be configured to provide the thermal heat transfer from the portion of the electric power system to the cooling fluid while managing a pressure drop across the cooling passageway. In some embodiments, each flow channel of the array of flow channels may have a cross-section that is non-linear.

In some embodiments, the array of flow channels may defined by a plurality of rows of fins. The plurality of rows of fins may extend into the cooling passageway.

In some embodiments, the flow of cooling fluid may have a flow rate of about 10 liters per minute. The cold plate may have a thermal resistance between about 0.00186 degrees Celsius per watt and about 0.00196 degrees Celsius per watt for the flow rate. In some embodiments, the pressure drop across the cooling passageway may be between about 28.4 millibar and about 211 millibar for an inlet temperature range of about 60 degrees Celsius to about negative 40 degrees Celsius.

In some embodiments, the cooling passageway may include a first section, a second section, and a third section. The first section may be in fluid communication with the inlet to receive the flow of cooling fluid. The second section may be in fluid communication with the first section and the outlet to discharge the flow of cooling fluid. The third section may be in fluid communication with the first section, the second section, and the outlet to discharge the flow of cooling fluid. In some embodiments, the first, second, and third sections may each extend between opposite side surfaces and are parallel to each other.

In some embodiments, the cooling passageway may further include a plurality of flow distributors. The plurality of flow distributors may be located at the inlet of the array of flow channels. The flow distributors may be configured to diffuse the flow of cooling fluid as the cooling fluid enters from the inlet across the array of flow channels so as to provide a uniform flow across the array of flow channels.

In some embodiments, the cold plate may further include a first side, a second side, and a drain system. The second side may be spaced apart from the first side to define a thickness of the cold plate. The drain system may be configured to remove condensation formed on the first side of the cold plate. In some embodiments, a portion of a surface of the first side may be sloped at an angle from a center of the cold plate to opposite sides of the cold plate toward the drain system.

In some embodiments, the drain system may include at least two side channels and a plurality of drain holes in each of the at least two side channels. The at least two channels may extend into the first side on opposite sides of the cold plate. The plurality of drain holes may extend through the cold plate.

These and other features of the present disclosure will become more apparent from the following description of the illustrative embodiments.

BRIEF DESCRIPTION OF THE DRAWINGS

FIG. 8 is a cross-sectional view of the drain system included in the cold plate of FIG. 7 taken alone line 8-8 showing the non-mounting surface is sloped toward the sides of the cold plate so that the condensation flows toward side channels of the drain system located on either side of the cold plate; and FIG. 9 is a cross cross-sectional view of the drain system included in the cold plate of FIG. 7 taken alone line 9-9 showing the drain system further includes drain holes that extend from the corresponding side channel through the cold plate to drain the condensation out of the system.

DETAILED DESCRIPTION OF THE DRAWINGS

Figure 1:
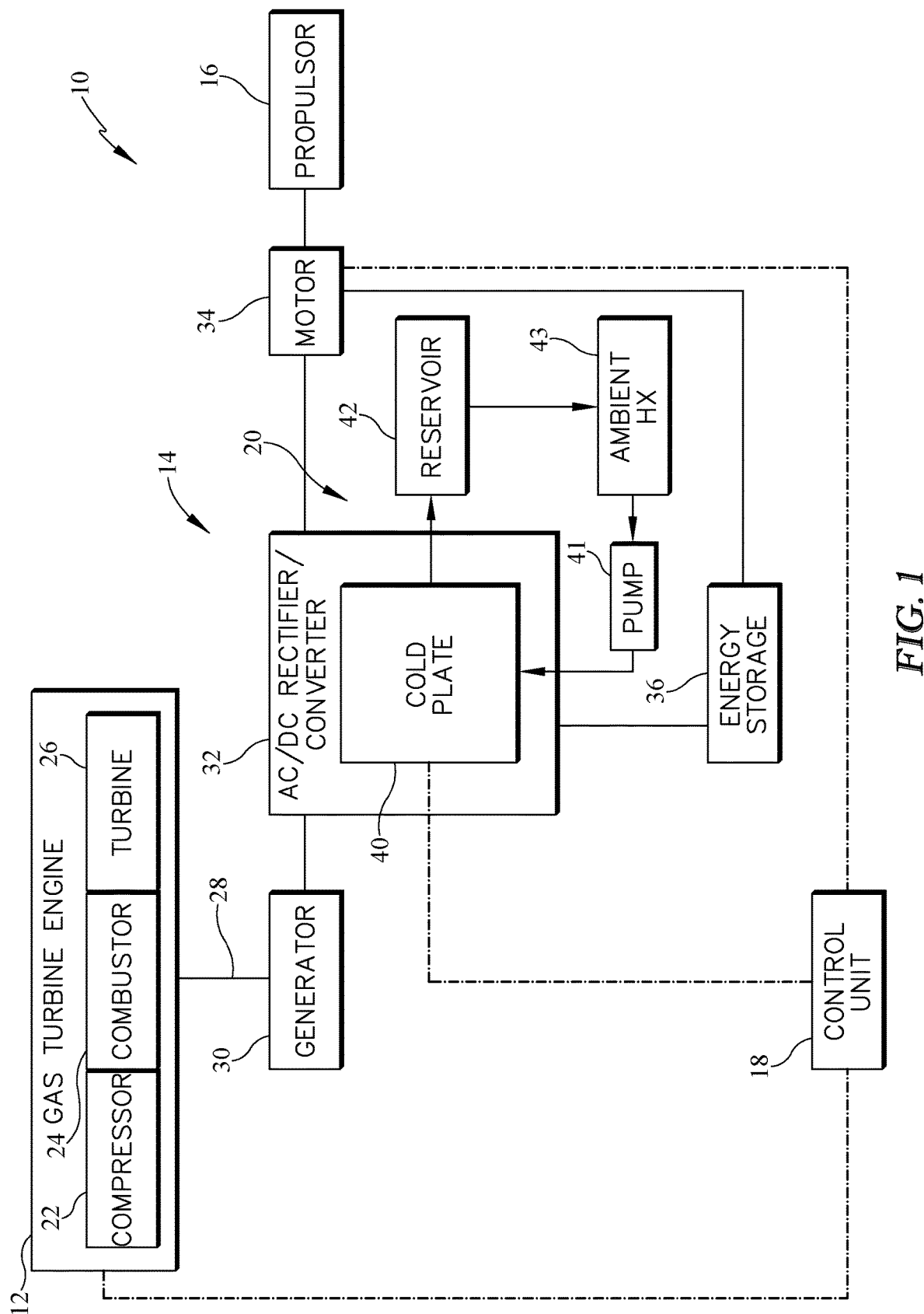
FIG. 1 is diagrammatic view of a hybrid turbo electric propulsion system adapted for use with an aircraft showing the system including a gas turbine engine, a generator coupled to the gas turbine engine to receive power generated by the gas turbine engine, a motor to drive a propulsor, a converter coupled to the generator and motor to convert power therebetween, and a thermal management system coupled to the converter and having a cold plate in thermal communication with the converter to cool the converter.

For the purposes of promoting an understanding of the principles of the disclosure, reference will now be made to a number of illustrative embodiments illustrated in the drawings and specific language will be used to describe the same.

A hybrid propulsion system 10 for use with an aircraft is shown in FIG. 1. The hybrid propulsion system includes a gas turbine engine 12, an electric power system 14, a propulsor 16, and a control unit 18 as shown in FIG. 1. The gas turbine engine 12 includes a compressor 22, a combustor 24 adapted to combine air received from the compressor 22 with fuel and ignite the fuel, and a turbine 26 configured to be rotated by the hot, high-pressure products of the combustion reaction in the combustor 24 to drive an output shaft 28 of the gas turbine engine 12. The electrical power system 14 is coupled to the output shaft of the gas turbine engine 12 and configured to generate electrical energy from the work output by the gas turbine engine 12. The propulsor 16 is powered by the electrical power system 14 to provide additional thrust for propelling the aircraft. The control unit 18 may control the supply of power to the different components.

The electrical power system 14 includes a generator 30, a converter 32, a motor 34, and an electrical storage device 36 as shown in FIG. 1. The generator 30 is coupled to the gas turbine engine 12 to generate electrical energy. The converter 32 is connected to the generator 30 to receive the electrical energy and either store it in the electrical storage device 36 or use it to power the motor 34. The motor 34 is configured to produce rotational energy in response to receiving electric energy from the converter 32.

In some embodiments, hybrid electric propulsion systems 10 may rely on power electronics such as rectifiers or converters for converting alternating current (AC) from a generator into direct current (DC). The direct current may then be passed through high voltage cabling before being converted back into AC for use in a motor. In doing so, the power electronics dissipate high heat load in upwards of about 2 to 3 kilowatts.

Thermal management of such power electronics may be important for overall performance and efficiency of the system 10. However, managing the temperature of such power electronics may be difficult, as the power electronics takes up a small space but produce a high heat load. Additionally, cooling the converter may create condensation, which may need to be evacuated from the system 10 to protect the electrical components.

To dissipate the high head load of the converter 32 in the small space allotted, the converter 32 includes a thermal management system 20 having a cold plate 40 and a pump 41 as shown in FIGS. 1-7. The cold plate 40 is in thermal communication with the converter 32, while the pump 41 is configured to move a flow of cooling fluid 21 through a cooling passageway 44 of the cold plate 40 to transfer heat from the converter 32 to the cooling fluid. The arrows 21 shown in FIG. 4 suggest the flow of cooling fluid.

Compared to typical cold plates, the cold plate 40 of the present disclosure is configured to dissipate a larger heat load in a smaller area, while minimizing the pressure drop across the cooling passageway 44. The cold plate 40 has a length of about 435 millimeters, a width of about 277 millimeters, and a thickness of about 15 millimeters to about 25 millimeters. The components of the converter 32 generates a heat load of about 2.5 kilowatts in this area footprint.

Figure 2:
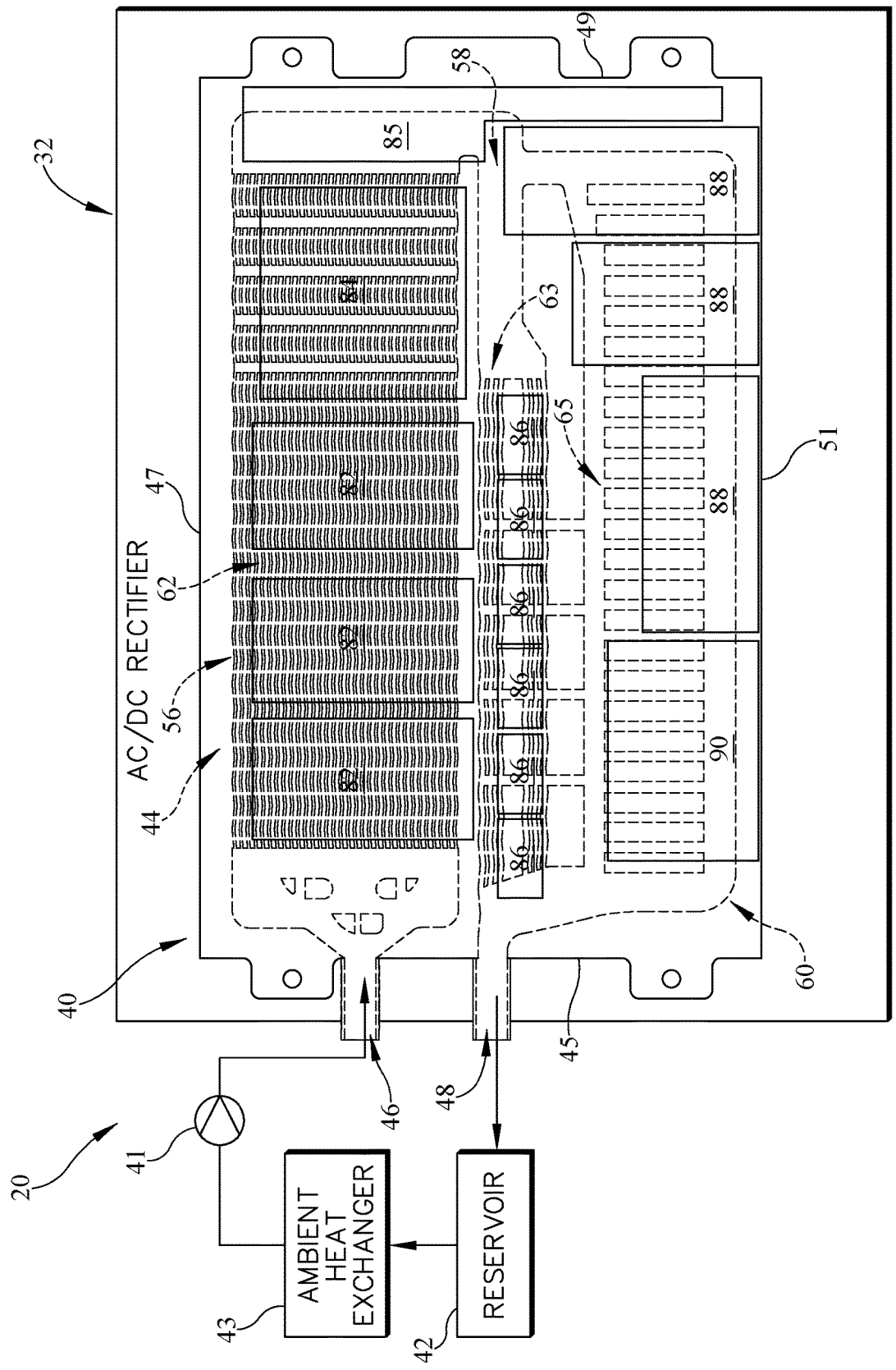
FIG. 2 is a perspective view of the converter with the thermal management system included in the hybrid turbo electric propulsion system of FIG. 1 showing the cold plate is engaged with the different components of the converter to transfer heat dissipated from the high power density components.
Figure 3:
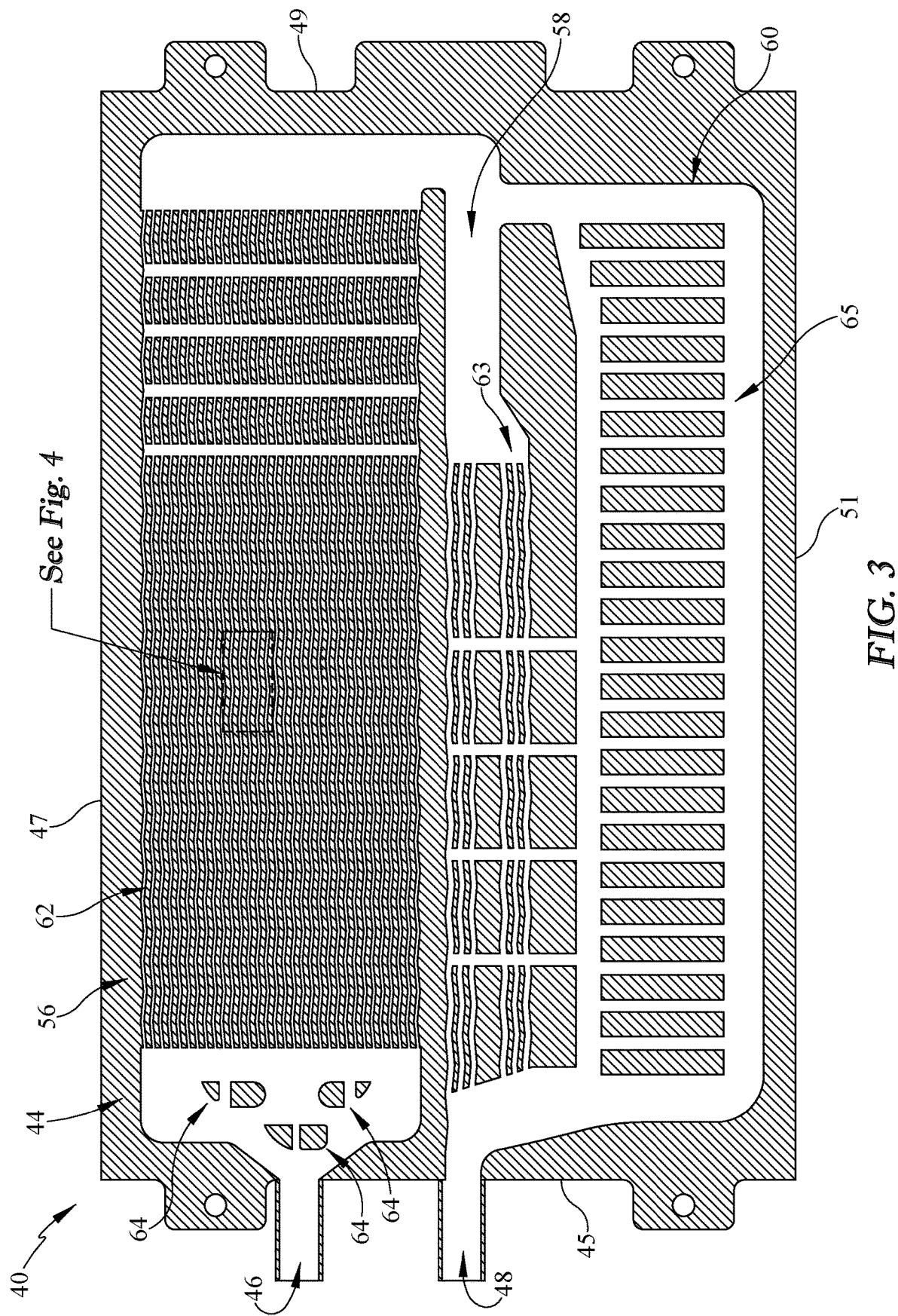
FIG. 3 is a cross-sectional view of the cold plate, included in the thermal management system of FIG. 2 showing the cold plate, which includes an inlet that receives the flow of cooling fluid, an outlet that discharges the flow of cooling fluid to the ambient heat exchanger, and a cooling passageway extending between and interconnecting the inlet and the outlet that has an array of flow channels and flow distributors located at the inlet of the flow channels to diffuse the flow of cooling fluid uniformly across the flow channels as it enters from the inlet.
Figure 4:
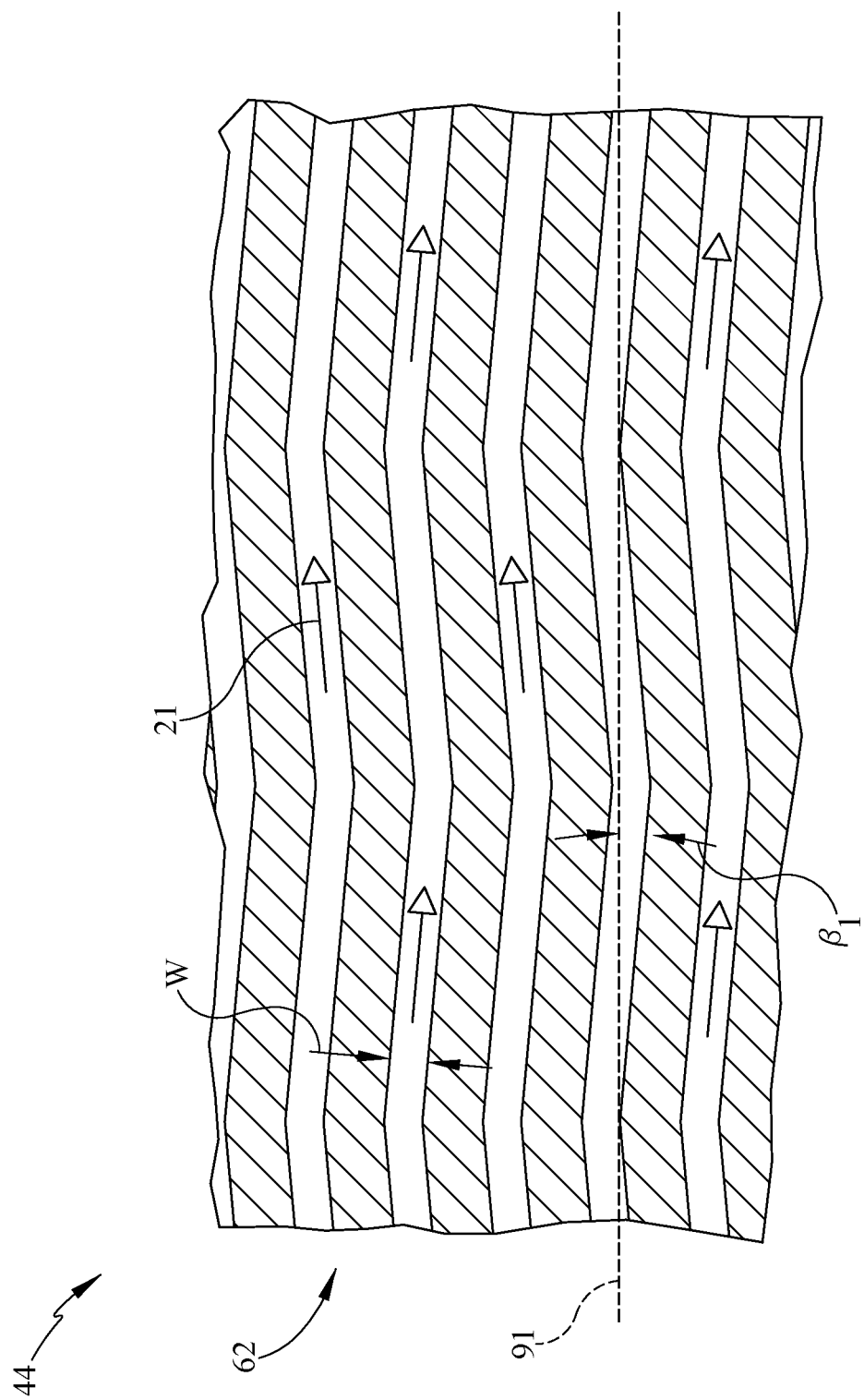
FIG. 4 is a detail view of the flow channels formed in the cooling passageway of the cold plate of FIG. 3, showing the flow channels have a non-linear cross section.

To decrease the thermal resistance of the cold plate 40 in the small footprint of the cold plate 40, while also minimizing the pressure drop across the cooling passageway 44, the cooling passageway 44 includes an array of parallel flow channels 62 and flow distributors 64 as shown in FIGS. 2-4. The array of flow channels 62 extends in a linear direction 91. Each channel 62 has a non-linear cross section with a width W of about 2.5 millimeters in the illustrative embodiment. The flow distributors 64 are located at the inlet of the array of flow channels 62 to diffuse the flow of cooling fluid across the array of flow channels 62. The flow distributors 64 provide a uniform flow across the flow channels 62 as the cooling fluid flows through the cooling passageway 44.

The pump 41 may be configured to provide the flow of cooling fluid to the cold plate 40 at a flow rate of about 10 liters per minute in the illustrative embodiment. The pressure drop across the cooling passageway 44 is between about 30.5 millibar and about 211 millibar for an inlet temperature range of about 60 degrees Celsius to about negative 40 degrees. The maximum pressure drop across the cooling passageway 44 is about 30.5 millibar when the cooling fluid has an inlet temperature of about 60 degrees Celsius. The pressure drop across the cooling passageway 44 is about 211 millibar when the cooling fluid has an inlet temperature of about negative 40 degrees Celsius. The control unit 18 may be configured to control the flow rate of cooling fluid through the cooling passageway 44.

The maximum thermal resistance of the cold plate 40 is about 0.001962 degrees Celsius per watt at the flow rate of about 10 liters per minute. The thermal resistance of the cold plate 40 of the present disclosure is about three times less than that of typical cold plates, which may have a thermal resistance of about 0.006 degrees Celsius per watt.

In addition to managing the thermal heat load of the converter 32, the cold plate 40 may also need to be able to withstand different mechanical loads during flight of the aircraft. During flight, the power electronics may be subjected to different loads caused by high-G maneuvers, hard landings, or other harsh conditions. The cold plate 40 therefore is also configured to withstand high stresses with minimal deformation to cold plate 40 and the flow channels 62 in the cooling passageway 44. In the illustrative embodiment, the cold plate 40 has a factor of safety of about 2.

Turning again to the thermal management system 20, the thermal management system 20 further includes a fluid reservoir 42 and an ambient heat exchanger 43 as shown in FIGS. 1 and 2. The cold plate 40 transfers heat from the converter 32 to cooling fluid 21 pumped through the cooling passageway 44 in the cold plate 40 by the pump 41. The ambient heat exchanger or condenser 43 is in fluid communication with the reservoir 42 to receive the cooling fluid 21. The condenser 43 is also in thermal communication with the atmosphere to transfer the heat from the cooling fluid 21 to the surrounding atmospheric air. The cooled cooing fluid 21 is then pumped back into the cold plate 40.

The cooling passageway 44 extends between and interconnects an inlet 46 in fluid communication with the pump 41 and an outlet 48 in fluid communication with the reservoir 42 as shown in FIGS. 2 and 3. The inlet 46 receives the flow of cooling fluid from the pump 41, while the outlet 48 discharges the flow of cooling fluid to the fluid reservoir 42 included in the thermal management system 20. The array of flow channels 62 are located in at least a portion of the cooling passageway 44 between the inlet 46 and the outlet 48. The inlet 46 and the outlet 48 are located on the same side 45 of the cold plate 40 in the illustrative embodiment.

The cold plate 40 further includes a first side 50, a second side 52, a plurality of side surfaces 45, 47, 49, 51, and a drain system 54 as shown in FIGS. 2-9. The first and second sides 50, 52 are spaced apart relative to one another to define a thickness of the cold plate 40. The side surfaces 45, 47, 49, 51 extend between and interconnect the first and second sides 50, 52.

Figure 7:
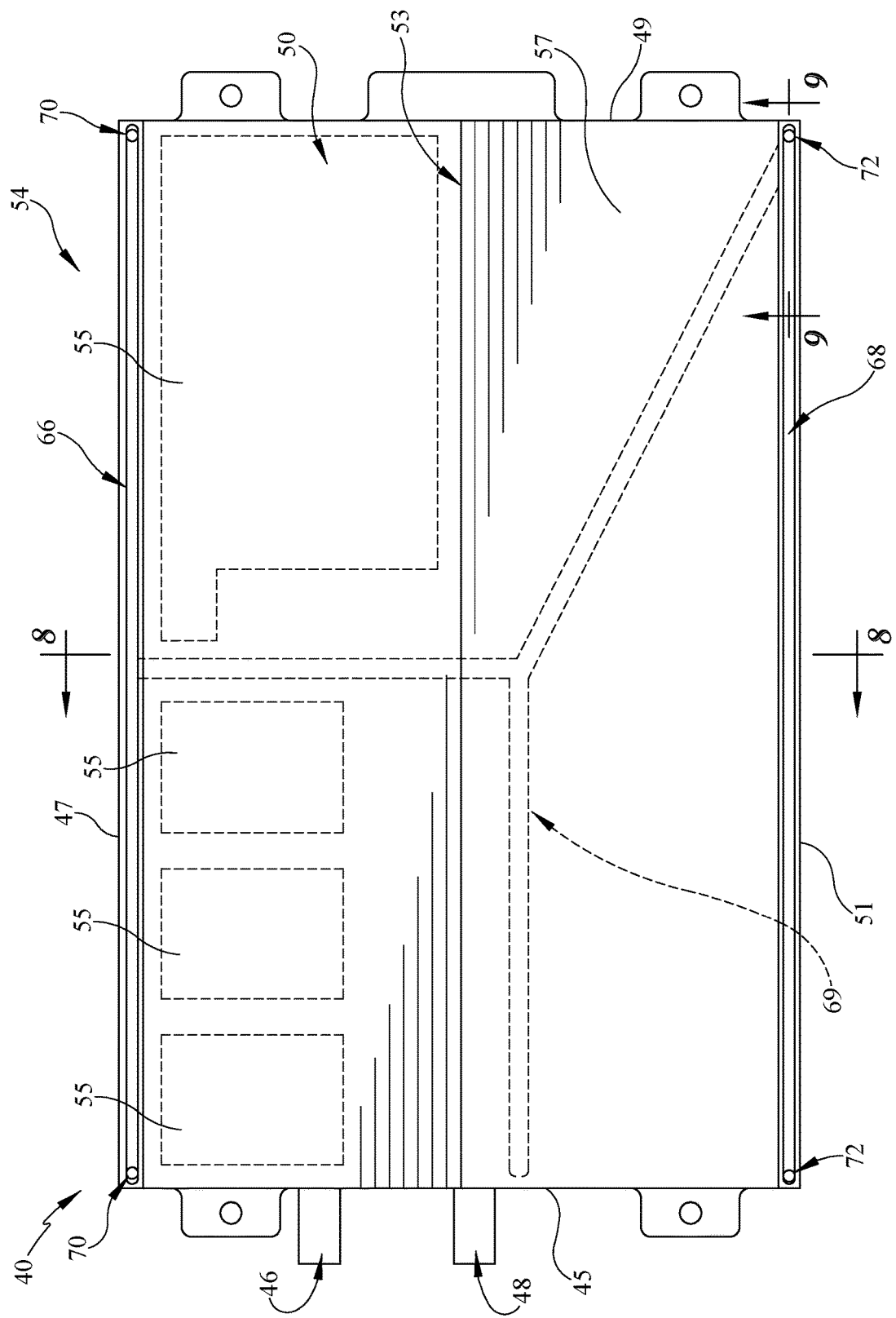
FIG. 7 is an elevation view of the cold plate including in the thermal management system for the converter of FIG. 1 showing the cold plate is shaped to include a drain system configured to mitigate condensation formed on a mounting surface of the cold plate away from the components of the converter.

The first side 50 of the cold plate 40 has a mounting surface 55 and non-mounting surface 57 as suggested in FIG. 7. The components of the converter 32 are coupled to the mounting surface 55, or mounting surface areas 55, while remaining area around the components of the converter 32 is the non-mounting surface 57. In the illustrative embodiments, the mounting surface 55 is raised a predetermined height relative to the non-mounting surface 57. The drain system 54 is configured to remove condensation from the non-mounting surface 57 of the cold plate 40, preventing it from moving onto the mounting surface 55 where the components are mounted to the cold plate 40.

The cooling passageway 44 includes a first section 56, a second section 58, and a third section 60 as shown in FIGS. 2-6. The first section 56 is in fluid communication with the inlet 46 to receive the flow of cooling fluid. The second section 58 is in fluid communication with the first section 56 and the outlet 48 to discharge the flow of cooling fluid. The third section 60 is in fluid communication with the first section 56, the second section 58, and the outlet 48 to discharge the flow of cooling fluid.

The sections 56, 58, 60 extend between the side surfaces 45, 49 in the linear direction 91 parallel to the other side surfaces 47, 51. The second and third sections 58, 60 are spaced apart from and extend parallel to the first section 56 in a direction perpendicular to the linear direction 91.

The first section 56 of the cooling passageway 44 forms the array of flow channels 62 and includes the flow distributors 64 located at the inlet of the array of flow channels 62 as shown in FIGS. 2 and 3. Each flow channel 62 has a substantially sinusoidal pattern in which the side surfaces of each channel extend at an angle $\beta_1$ relative to the linear direction 91 as shown in FIG. 4.

In the illustrative embodiment, the second section 58 includes another array of flow channels 63 as shown in FIGS. 2 and 3. The flow channels 63 have the same substantially sinusoidal pattern of the flow channels 62 as shown in FIG. 4.

In the illustrative embodiment, the third section 60 includes a ladder type configuration of flow channels 65 as shown in FIG. 3. The flow channels 65 of the ladder type configuration extends substantially perpendicular to the flow channels 62, 63 of the first and second sections 56, 58.

The drain system 54 includes side channels 66, 68, drain holes 70, 72, and pins 74 as shown in FIGS. 7-9. The side channels 66, 68 extend into the first side 50 on opposite sides of the cold plate 40 near the side surfaces 47, 51. The first side channel 66 is adjacent to the side surface 47 and the second side channel 68 is adjacent to the side surface 51. Each of the drain holes 70, 72 extend through the cold plate 40 at either ends of the channel 66, 68.

The non-mounting surface 57 is sloped towards the side channels 66, 68 as shown in FIG. 8. The non-mounting surface 57 is sloped such that the non-mounting surface 57 extends at an angle α from a center 53 of the cold plate 40 to the each of the sides 49, 51. The sloped non-mounting surface 57 causes the condensation formed on the non-mounting surface 57 to flow toward the side channels 66, 68. The side channels 66, 68 prevent the condensation from flowing onto the mounting surface areas 55 on the first side 50 of the cold plate 40. The drain holes 70, 72 in the channels 66, 68 divert the condensation out of the channels 66, 68 outside the housing of the converter 32.

The slope has a maximum height h at the center 53 of the cold plate 40 as shown in FIG. 8. The height h of the slope is about 2.5 millimeters in the illustrative embodiment. In other embodiments, the height h of the slope may be between about 2 millimeters and 3 millimeters.

In the illustrative embodiment, the side channels 66, 68 extend parallel to the side surfaces 47, 51 between the side surfaces 45, 49. In some embodiments, the drain system 54 has additional channels 69 that extend into the non-mounting surface 57 between the mounting surface areas 55. The channels 69 may extend to the side channels 66, 68 as suggested in FIG. 7. In other embodiments, the channels 69 may replace the side channels 66, 68.

In the illustrative embodiment, each channel 66, 68 includes two drain holes 70, 72. The drain holes 70 extend through cold plate 40 in the channel 66 at either end of the channel 66. The drain holes 72 extend through the cold plate 40 in the channel 68 at either end of the channel 68. In other embodiments, the drain system 54 may include more than two drain holes 70, 72 in each channel 66, 68. In some embodiments, the channel 69 may also include a drain hole 70, 72 at each end.

Each drain hole 70, 72 is shaped to include a first portion 76, a second portion 78, and a third portion 80 as shown in FIG. 9. The first portion 76 extends into the channel 66, 68. The second portion 78 extends into the side surface 45, 47. The second portion 78 is perpendicular to the side surface 45, 47 and connects the first portion 76 to the third portion 80. The third portion 80 extends into the second side 52 to the second portion 78. The third portion 80 is offset from the first portion 76. The pin 74 extends into the second portion 78 of the drain hole 70, 72 to close off the inlet of the second portion 78.

The second portion 78 offsets the third portion 80 from the first portion 76 to prevent external fluid from entering back through the hole 70, 72. The pin 74 closes off the second portion 78.

Turning again to the electric power system 14, the converter 32 includes semiconductors 82, resistor boards 84, power board 85, resistors 86, EMI filter inductors 88, and an inductor 90 as suggested in FIG. 2. The semiconductors 82 are located over a first portion of the array of flow channels 62 in the first section 56 of the cooling passageway 44. The resistor board 84 is located over a second portion of the array of flow channels 62 in the first section 56 of the cooling passageway 44. The resistors 86 are located over the second section 58 of the cooling passageway 44. The EMI filter inductors 88 and the inductor 90 are located over the third section 60 of the cooling passageway 44.

The semiconductors 82 each generate a heat load of about 637.5 watts. The resistor board 84 generate a total heat load of about 80 watts. The resistors 86 each generate a heat load of about 106.25 watts. The EMI filter inductors 88 each generate a heat load of about 40 watts. The inductor 90 generate a heat load of about 56.25 watts. In total, the components of the converter 32 generates a heat load of about 2.5 kilowatts.

Figure 5:
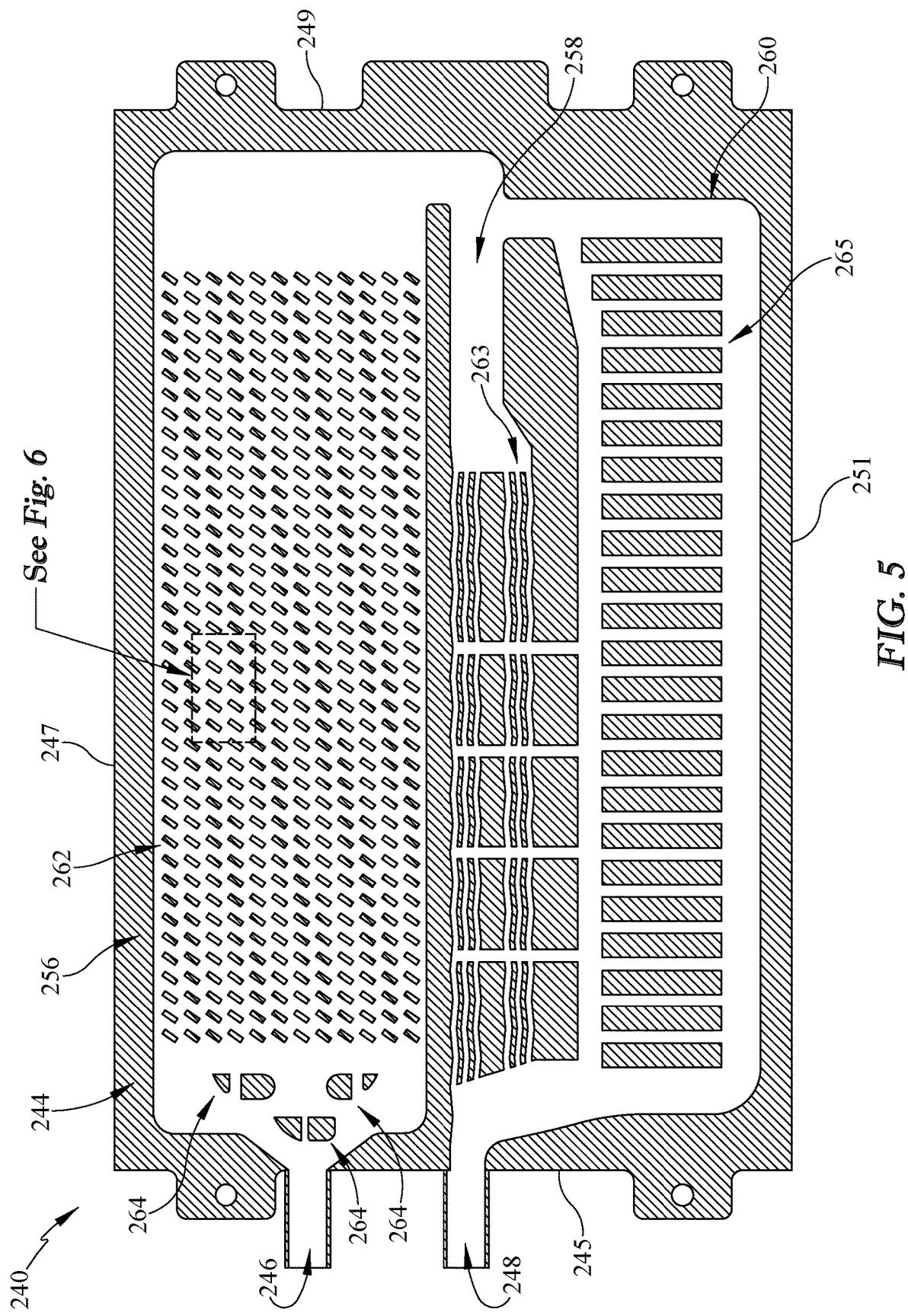
FIG. 5 is another embodiment of a cold plate included in thermal management system for the converter of FIG. 1 showing the cold plate includes an inlet that receives the flow of cooling fluid, an outlet that discharges the flow of cooling fluid to the ambient heat exchanger, and a cooling passageway extending between and interconnecting the inlet and the outlet that has an array of flow channels defined by a plurality of fins.
Figure 6:
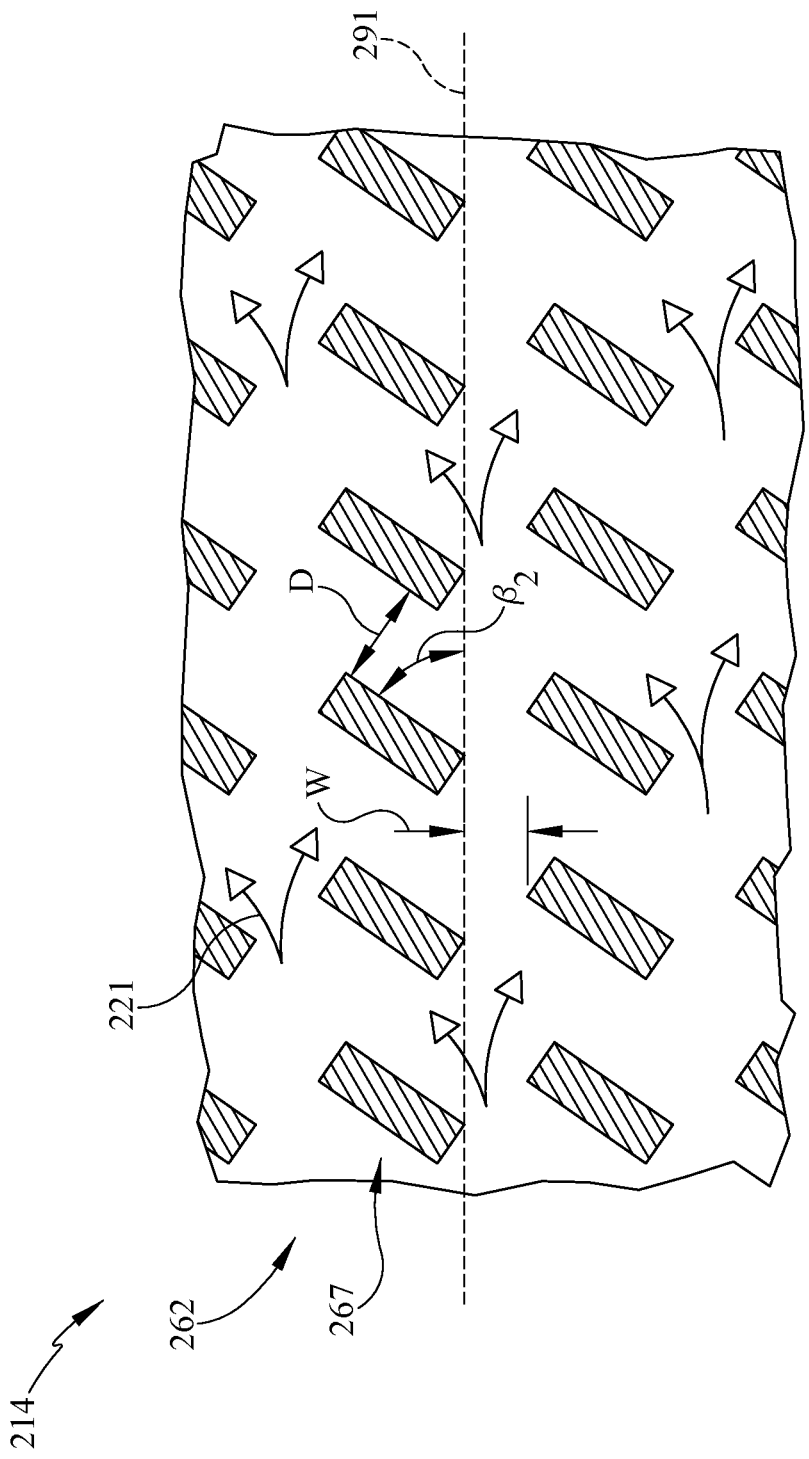
FIG. 6 is a detail view of the flow channels formed in the cooling passageway of the cold plate of FIG. 5 showing the plurality of fins are at an angle.

Another embodiment of a cold plate 240 in accordance with the present disclosure is shown in FIGS. 5 and 6. The cold plate 240 is substantially similar to the cold plate 40 shown in FIGS. 1-4 and described herein. Accordingly, similar reference numbers in the 200 series indicate features that are common between the cold plate 240 and the cold plate 40. The description of the cold plate 40 is incorporated by reference to apply to the cold plate 240, except in instances when it conflicts with the specific description and the drawings of the cold plate 240.

The cold plate 240 is shaped to include a cooling passageway 244 as shown in FIGS. 5 and 6. The cooling passageway 244 extends between and interconnects an inlet 246 and an outlet 248 of the cold plate 240 and is shaped to define an array of parallel flow channels 262 defined by rows of fins 267 as shown in FIGS. 5 and 6. The array of flow channels 262 defined by the rows of fins 267 are configured to increase the thermal heat transfer from the converter 32 to a flow of cooling fluid 221, while minimizing a pressure drop across the cooling passageway 244.

The flow channels 262 are defined by the rows of fins 267 in a first section 256 of the cooling passageway 240 as shown in FIGS. 5 and 6. Each row of fins 267 are spaced apart at a width W. Each of the fins 267 extend into the cooling passageway 244 are equally spaced apart from each other at a distance D. The fins 267 are also each angled at an angle 132 relative to a linear direction indicated by the line 291. The space between the fins 267 allows the flow of cooling fluid 221 to move between and intermix with the channels 262.

The second section 258 includes another array of flow channels 263 and the third section 260 has a ladder type configuration of flow channels 265 as shown in FIG. 5. The sections 256, 258, 260 extend between the side surfaces 245, 249 parallel to the other side surfaces 247, 251. The second and third sections 258, 260 are spaced apart from and extend parallel to the first section 256.

The first section 256 of the cooling passageway 244 also includes flow distributors 264 located at the inlet of the array of flow channels 262 as shown in FIG. 5. The flow distributors 264 are configured to diffuse the flow of cooling fluid as it enters from the inlet 246 across the rows of fins 267 so as to provide a uniform flow across the plurality of fins 267.

The present disclosure relates to a cold plate 40, 240 configured to dissipate high power with a minimized pressure drop. The cold plate 40 is also shaped to include a drain system 54 to eliminate the condensed water from the electrical components.

Power electronics, like the converter 32, have a high heat load that has to be dissipated from a small footprint by the cold plate 40, 240. The high heat loss in the order of 2-3 kilowatts may also need to be dissipated from the smaller foot print at a low pressure drop, i.e. less than 500 millibar, without compromising the structural rigidity of the cold plate 40, 240

Therefore, the cold plate 40, 240 is configured to provide a high heat transfer at low pressure drop in order to dissipate high power in aerospace applications. The cold plate 40 includes a cooling passageway 44 with a plurality of wavy channels 62 as shown in FIGS. 2-4. The cold plate 40 accommodates various types of electrical components to keep the converter temperature within the operating limits for the given foot print. The inlet 46 of the cooling passageway 44 provides optimum and uniform flow across all the plurality of wavy channels 62.

The dimensions of the cold plate 40, 240 are constrained by the overall system packaging layout and the weight of the converter 32. The cold plate 40, 240 of the present disclosure has a length of about 435 millimeters, a width of about 277 millimeters, and a depth or thickness or about 15 millimeters to about 25 millimeters. The width of each wavy channel is about 2.5 millimeters.

The cold plate 40, 240 is made of aluminum alloy in the illustrative embodiment. In other embodiments, the cold plate 40, 240 may be made of other suitable aluminum alloys. The cooling fluid is water ethylene glycol WEG (60/40) for forced liquid cooling in the illustrative embodiment.

The cold plate 40, 240 provided with the cooling fluid at a fluid inlet temperature of about 60 degrees Celsius provides a maximum pressure drop of about 30.5 millibar. A pressure of about 211 millibar is achieved for the inlet temperature of negative 40° C., which is the lowest operating temperature of the cooling fluid.

In the illustrative embodiment, the pump 41 may be configured to provide the flow of cooling fluid to the cold plate 40 at a flow rate of about 10 liters per minute in the illustrative embodiment. For an inlet temperature range of about 60 degrees Celsius to about negative 40 degrees, the pressure drop across the cooling passageway 44 may be between about 30.5 millibar and about 211 millibar.

In the illustrative embodiment, when the cooling fluid has an inlet temperature of about 60 degrees Celsius, the pressure drop across the cooling passageway 44 may be about 30.5 millibar. In other embodiments, when the cooling fluid has an inlet temperature of about 40 degrees Celsius, the pressure drop across the cooling passageway 44 may be about 35.9 millibar.

In some embodiments, when the cooling fluid has an inlet temperature of about 20 degrees Celsius, the pressure drop across the cooling passageway 44 may be about 48.3 millibar. In other embodiments, when the cooling fluid has an inlet temperature of about 0 degrees Celsius, the pressure drop across the cooling passageway 44 may be about 78.2 millibar.

In some embodiments, when the cooling fluid has an inlet temperature of about negative 20 degrees Celsius, the pressure drop across the cooling passageway 44 may be about 204 millibar. In other embodiments, when the cooling fluid has an inlet temperature of about negative 40 degrees Celsius, the pressure drop across the cooling passageway 44 may be about 211 millibar.

The usually high-pressure drop accompanied by the thin channel width is mitigated by the parallel channels 62 formed in the cooling passageway 44. Comparatively, the pressure drop in the conventional cold plates for the flowrate of 10 liters per minute (lpm) at a temperature of about 40° C. is 389 millibar, whereas the pressure drop of the cold plate 40, 240 of the present disclosure is 10 times lower than the conventional cold plates.

For the 10 liters per minute flowrate and inlet fluid temperature at 60° C., the maximum and average cold plate surface temperature are found to be 85.5° C. and 65.5° C. respectively. The outlet temperature of fluid is about 64.69° C. The surface temperature below the semiconductors 82 is found to be 76.8° C.

The maximum thermal resistance of the cold plate 40 is 0.001962° C./W at 10 lpm flow rate, which is 3 times better than the conventional cold plates, which stands at 0.006° C./W. The cold plate 240 with the angled fin configuration as shown in FIG. 6, provides a maximum thermal resistance of 0.001869° C./W at 10 lpm flow rate with a fluid inlet temperature of 60° C.

The maximum pressure drop of the cold plate 240 is 28.4 millibar, which is even lower than the maximum pressure drop of the cold plate 40. For the 10 liters per minute flowrate and inlet fluid temperature at 60° C., the maximum cold plate surface temperature is 85° C. and the average surface temperature is 65.24° C. The outlet temperature of fluid may be about 64.7° C. The surface temperature below the semiconductors 82 may be about 83° C.

In additional to managing the thermal heat load, the cold plate 40, 240 may need to withstand different mechanical loads. During static, model, vibration and crash analysis, the cold plate 40, 240 was found to comply with DO-160G loading requirements. Static, modal, and shock analyses were performed on the cold plate 40, 240 to determine its stresses, displacements, natural frequency and acceleration (Mode superposition), to estimate the factor of safety based on the obtained results.

All the static and shock input loads for the analysis of the cold plate 40, 240 were in accordance with the DO-160G, Section 8 of the Vibration category standard. A terminal saw tooth shock pulse for a nominal time duration of 11 milliseconds was used for the standard shock testing.

A standard operational shock pulse of 6 g of g-force for 11 milliseconds and a crash safety impulse of 20 g for 11 milliseconds were used for the shock analysis. The cold plate 40, 240 may be comprised of Aluminum Alloy. Its material properties and a distributed mass of 15 kilograms is applied over the footprints on cold plate 40, 240.

From the obtained static analysis results, the maximum stress on the cold plate 40, 240 for the standard operational condition of 6 g was observed to be about 31.426 MPa. The maximum displacement of the cold plate 40, 240 during this analysis was observed to be about 0.13 millimeters, which is within the allowable deformation. By considering yielding as the safety criteria, the design safety factor is 8.9 based on the yield strength of Aluminum Alloy (280 MPa).

During the crash safety static loading simulation of 20 g, the maximum stress on the cold plate 40, 240 was observed to be 104.75 MPa. This resulted in a safety factor of about 2.67 and the maximum displacement of the cold plate 40, 240 is about 0.45 millimeters, which is within the allowable deformation. Additionally, modal analysis showed that the first natural frequency of the cold plate 40, 240 is about 122.5 Hz, which is below the excitation frequency of 154 Hz.

Transient shock analysis on the cold plate 40, 240 showed that for the Y direction shock loading, the maximum stress was found to be about 28.09 MPa. This results in a design safety factor of about 10. The maximum displacement of the cold plate 40, 240 is about 0.12 millimeters, which is within the allowable limit. Analysis of the directional acceleration plot along the Y direction also showed a maximum value of 6.6 g on the cold plate 40, 240 at 25 milliseconds.

For the crash safety shock loading conditions, the maximum stress on the cold plate 40, 240 was found to be about 93.631 MPa. This results in a design safety factor of about 3 based on the yield strength of Aluminum Alloy (280 MPa). The maximum displacement of the cold plate 40, 240 is about 0.4 millimeters, which is within the allowable limit. Analysis of the directional acceleration plot along the Y direction showed a maximum value of 22 g on the cold plate 40, 240 at 25 milliseconds.

Static and dynamic analysis were performed on the cold plate 40, 240, considering the DO-160G standards for both standard operating (6G for 11 milliseconds) and crash safety (20G for 11 milliseconds) conditions, to determine the dynamic behavior and safety of the cold plate 40, 240. The obtained results showed that the cold plate 40, 240 is safe to operate under the given conditions with a design safety factor of more than 1.5 (factor of safety requirement based on CS23.303 standard).

Since the electrical components and the printed circuit, boards inside the system 32 are sensitive to the condensation due to pressure and temperature variations, the condensate may be drained from the system 32. As the electrical systems are highly packed, draining the condensation from the system 32 may be difficult. The drain system 54 of the present disclosure for the converter 32 ensures all the water droplets may be drained, in which ever the orientation the system is mounted.

Conventional cold plates have relative flat mounting and non-mounting surfaces. The cold plate 40 of the present disclosure has a non-mounting surface 57 with a slope of about one degree from the center 53 of the cold plate 40. The slope displaces the water droplets to the sides of the enclosure. The degree of slope is dictated by the thickness of the cold plate, size of the system and the weight. Albeit, higher the slope will facilitate the movement of water droplets, it invariably adds more weight.

Additionally, the drain system 54 further includes two channels 66, 68 that run the entire length of the cold plate 40. The water droplets may be collected in the channels 66, 68 so that the condensation will not move into the mounting surface areas 55.

Each channel 66, 68 has a depth d of about 3 millimeters. The depth d of the channels 66, 68 is determined by the above structural analysis. The depth of the channel 66, 68 may be deep enough in order to prevent the water droplets from moving out due to vibration and shock the flight will undergo.

At the end of the channels 66, 68 on all four corners the drain system 54 further includes drain holes 70, 72. Apart from draining the condensed water droplets from the system, the drain holes 70, 72 may also prevent any external water from going into the enclosure during the spray test. In order to prevent that, the drain holes 70, 72 has an offset portion 78.

Vacuum brazing technique may be used to manufacture the cold plate 40, 240. Vacuum brazing is a high-end joining technology that results in parts with extremely strong joints and no residual corrosive flux. Vacuum brazing is a process in which two base metals, such as aluminum plates, are joined using a filler metal that has a melting point below that of the base metal. The filler metal, also known as a braze alloy, is drawn into the closely mated parallel surfaces of the aluminum plates by capillary action. Up to 10 bar joint pressure can be obtained by vacuum brazing technique.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A hybrid propulsion system for use with an aircraft, the hybrid propulsion system comprising:
a gas turbine engine including a compressor, a combustor, and a turbine,
an electric power system including a generator coupled to the gas turbine engine to generate electrical energy, a converter connected to the generator to receive the electrical energy from the generator, and a motor configured to produce rotational energy in response to receiving electric energy from the converter,
at least one propulsor configured to use energy received from the electric power system to generate thrust for propelling the aircraft, and
a thermal management system configured to cool a heat load produced by the converter of the electric power system, the thermal management system including a cold plate in thermal communication with the converter and a pump configured to move a flow of cooling fluid through the cold plate to transfer heat from the converter to the cooling fluid,
wherein the cold plate includes an inlet configured to receive the flow of cooling fluid from the pump, an outlet adjacent to the inlet and configured to discharge the flow of cooling fluid, and a cooling passageway extending between and interconnecting the inlet and the outlet, the cooling passageway shaped to define at least one array of parallel flow channels that are configured to provide the thermal heat transfer from the converter to the cooling fluid while managing a pressure drop across the cooling passageway,
wherein the cooling passageway includes a first section in fluid communication with the inlet to receive the flow of cooling fluid, a second section in fluid communication with the first section and the outlet to discharge the flow of cooling fluid, and a third section in fluid communication with the first section, the second section, and the outlet to discharge the flow of cooling fluid, the first, second, and third sections each extend between opposite side surfaces and are parallel to each other, and
wherein the first section includes a first array of parallel flow channels, the second section includes a second array of parallel flow channels, and the third section including a ladder type configuration of flow channels.

2. The system of claim 1, wherein each flow channel of the at least one array of flow channels has a width of about 2.5 millimeters.

3. The system of claim 2, wherein each flow channel of the at least one array of flow channels has a cross-section that is non-linear.

4. The system of claim 2, wherein the at least one array of flow channels is defined by a plurality of rows of fins that extend into the cooling passageway.

5. The system of claim 1, wherein a flow rate of the flow of cooling fluid is about 10 liters per minute and the cold plate has a thermal resistance between about 0.00186 degrees Celsius per watt and about 0.00196 degrees Celsius per watt.

6. The system of claim 5, wherein the pressure drop across the cooling passageway is between about 28.4 millibar and about 211 millibar for an inlet temperature range of about 60 degrees Celsius to about negative 40 degrees Celsius.

7. The system of claim 1, wherein the first section of the cooling passageway has flow distributors located at the inlet of the first array of flow channels and the flow distributors are configured to diffuse the flow of cooling fluid as the cooling fluid enters from the inlet across the first array of flow channels so as to provide a uniform flow across the first array of flow channels.

8. A hybrid propulsion system
for use with an aircraft, the hybrid propulsion system comprising:
a gas turbine engine including a compressor, a combustor, and a turbine,
an electric power system including a generator coupled to the gas turbine engine to generate electrical energy, a converter connected to the generator to receive the electrical energy from the generator, and a motor configured to produce rotational energy in response to receiving electric energy from the converter,
at least one propulsor configured to use energy received from the electric power system to generate thrust for propelling the aircraft, and
a thermal management system configured to cool a heat load produced by the converter of the electric power system, the thermal management system including a cold plate in thermal communication with the converter and a pump configured to move a flow of cooling fluid through the cold plate to transfer heat from the converter to the cooling fluid,
wherein the cold plate includes an inlet configured to receive the flow of cooling fluid from the pump, an outlet adjacent to the inlet and configured to discharge the flow of cooling fluid, and a cooling passageway extending between and interconnecting the inlet and the outlet, the cooling passageway shaped to define at least one array of parallel flow channels that are configured to provide the thermal heat transfer from the converter to the cooling fluid while managing a pressure drop across the cooling passageway, and
wherein the cold plate further includes a first side configured to mount the components of the converter, a second side spaced apart from the mounting surface to define a thickness of the cold plate, and a drain system configured to remove condensation formed on the first side of the cold plate so that the condensation does not contact the components of the converter, the first side includes a mounting surface engaged with the components of the converter and a non-mounting surface that is sloped at an angle from a center of the cold plate to opposite sides of the cold plate toward the drain system.

9. The system of claim 8, wherein the drain system includes at least two side channels that extend into the non-mounting surface on opposite sides of the cold plate and a plurality of drain holes in each of the at least two side channels that extend through the cold plate.

10. A hybrid propulsion system for use with an aircraft, the hybrid propulsion system comprising:
a gas turbine engine,
at least one propulsor configured to generate thrust for propelling the aircraft,
an electric power system coupled to the gas turbine engine to generate electrical energy and coupled the at least one propulsor to provide the electrical energy to drive the at least one propulsor, and
a thermal management system configured to cool a heat load produced by the electric power system, the thermal management system including a cold plate in thermal communication with a portion of the electric power system and a pump configured to move a flow of cooling fluid through the cold plate to transfer heat from the portion of the electric power system to the cooling fluid,
wherein the cold plate includes an inlet configured to receive the flow of cooling fluid from the pump, an outlet adjacent to the inlet and configured to discharge the flow of cooling fluid, and a cooling passageway extending between and interconnecting the inlet and the outlet, the cooling passageway shaped to define an array of flow channels that are configured to provide the thermal heat transfer from the portion of the electric power system to the cooling fluid while managing a pressure drop across the cooling passageway, and wherein the cold plate further includes a first side, a second side spaced apart from the first side to define a thickness of the cold plate, and a drain system configured to remove condensation formed on the first surface of the cold plate, and wherein a portion of a surface of the first side is sloped at an angle from a center of the cold plate to opposite sides of the cold plate toward the drain system.

11. The system of claim 10, wherein each flow channel of the array of flow channels has a cross-section that is non-linear.

12. The system of claim 10, wherein the array of flow channels is defined by a plurality of rows of fins that extend into the cooling passageway.

13. The system of claim 10, wherein a flow rate of the flow of cooling fluid is about 10 liters per minute and the cold plate has a thermal resistance between about 0.00186 degrees Celsius per watt and about 0.00196 degrees Celsius per watt.

14. The system of claim 10, wherein the pressure drop across the cooling passageway is between about 28.4 millibar and about 211 millibar for an inlet temperature range of about 60 degrees Celsius to about negative 40 degrees Celsius.

15. The system of claim 10, wherein the cooling passageway includes a first section in fluid communication with the inlet to receive the flow of cooling fluid, a second section in fluid communication with the first section and the outlet to discharge the flow of cooling fluid, and a third section in fluid communication with the first section, the second section, and the outlet to discharge the flow of cooling fluid, the first, second, and third sections each extend between opposite side surfaces and are parallel to each other.

16. The system of claim 10, wherein the cooling passageway further includes a plurality of flow distributors located at the inlet of the array of flow channels and configured to diffuse the flow of cooling fluid as the cooling fluid enters from the inlet across the array of flow channels so as to provide a uniform flow across the array of flow channels.

17. The system of claim 10, wherein the drain system includes at least two side channels that extend into the surface of the first side on opposite sides of the cold plate and a plurality of drain holes in each of the at least two side channels that extend through the cold plate.

18. The system of claim 1, wherein the cold plate further includes a first side configured to mount the components of the converter, a second side spaced apart from the mounting surface to define a thickness of the cold plate, and a drain system configured to remove condensation formed on the first side of the cold plate so that the condensation does not contact the components of the converter, the first side includes a mounting surface engaged with the components of the converter and a non-mounting surface that is sloped at an angle from a center of the cold plate to opposite sides of the cold plate toward the drain system.

19. The system of claim 18, wherein the drain system includes at least two side channels that extend into the non-mounting surface on opposite sides of the cold plate and a plurality of drain holes in each of the at least two side channels that extend through the cold plate.

\* \* \* \* \*